(12) United States Patent
Pappert et al.

(10) Patent No.: US 7,175,791 B2
(45) Date of Patent: Feb. 13, 2007

(54) PROCESS FOR PRODUCING DISH-SHAPED MOLDINGS OF THERMOPLASTIC MATERIAL

(75) Inventors: Michael Pappert, Eitorf (DE); Alfred Jira, Konigswinter (DE); Andreas Hollweg, Hennef (DE); Wolfgang Kummer, Siegburg (DE); Peter Klusener, Bonn (DE)

(73) Assignee: Kautex Maschinenbau GmbH, Bonn (DE)

(*) Notice: Subject to any disclaimer, the term of this patent is extended or adjusted under 35 U.S.C. 154(b) by 252 days.

(21) Appl. No.: 10/361,541

(22) Filed: Feb. 10, 2003

(65) Prior Publication Data

US 2003/0164572 A1    Sep. 4, 2003

(30) Foreign Application Priority Data

Feb. 8, 2002    (DE) .............................. 102 05 524

(51) Int. Cl.
*B29C 47/00* (2006.01)

(52) U.S. Cl. .................... 264/146; 264/150; 264/320

(58) Field of Classification Search ................ 264/150, 264/146, 515, 533–554, 516, 151, 211.12, 264/167
See application file for complete search history.

(56) References Cited

U.S. PATENT DOCUMENTS

| | | | |
|---|---|---|---|
| 3,733,381 A | 8/1973 | Willette et al. ............... 264/47 |
| 3,946,896 A * | 3/1976 | Lemelson ................... 220/273 |
| 4,393,023 A * | 7/1983 | Schurman ................... 264/150 |
| 6,176,699 B1 | 1/2001 | Franjo et al. ............... 425/528 |
| 6,428,739 B1 | 8/2002 | Franjo et al. ............... 264/529 |
| 2001/0015513 A1 | 8/2001 | Schaftingen et al. ........ 264/515 |
| 2002/0024171 A1* | 2/2002 | Rohde et al. ............... 264/515 |

FOREIGN PATENT DOCUMENTS

| | | |
|---|---|---|
| DE | 100 21 055 | 12/2000 |
| DE | 100 10 900 | 9/2001 |
| EP | 10 53 858 | 3/2000 |
| EP | 11 10 697 | 6/2001 |
| JP | 09 001640 | 1/1997 |
| WO | WO 01/60592 | 8/2001 |

* cited by examiner

*Primary Examiner*—Leo B. Tentoni
(74) *Attorney, Agent, or Firm*—Grossman Tucker Perreault & Pfleger, PLLC

(57) ABSTRACT

A process for the production of dish-shaped moldings or hollow bodies of thermoplastic material comprises the step of producing an at least approximately tubular preform by the extrusion of thermoplastic material. The preform is axially divided to form at least one single-layer web of material which is removed from the extrusion head by being engaged by means of a manipulator which spreads and/or straightens the web transversely with respect to the extrusion direction. The web is then transferred to a molding tool by a manipulator for it to be put into its final form in its first heat in the molding tool.

11 Claims, 3 Drawing Sheets

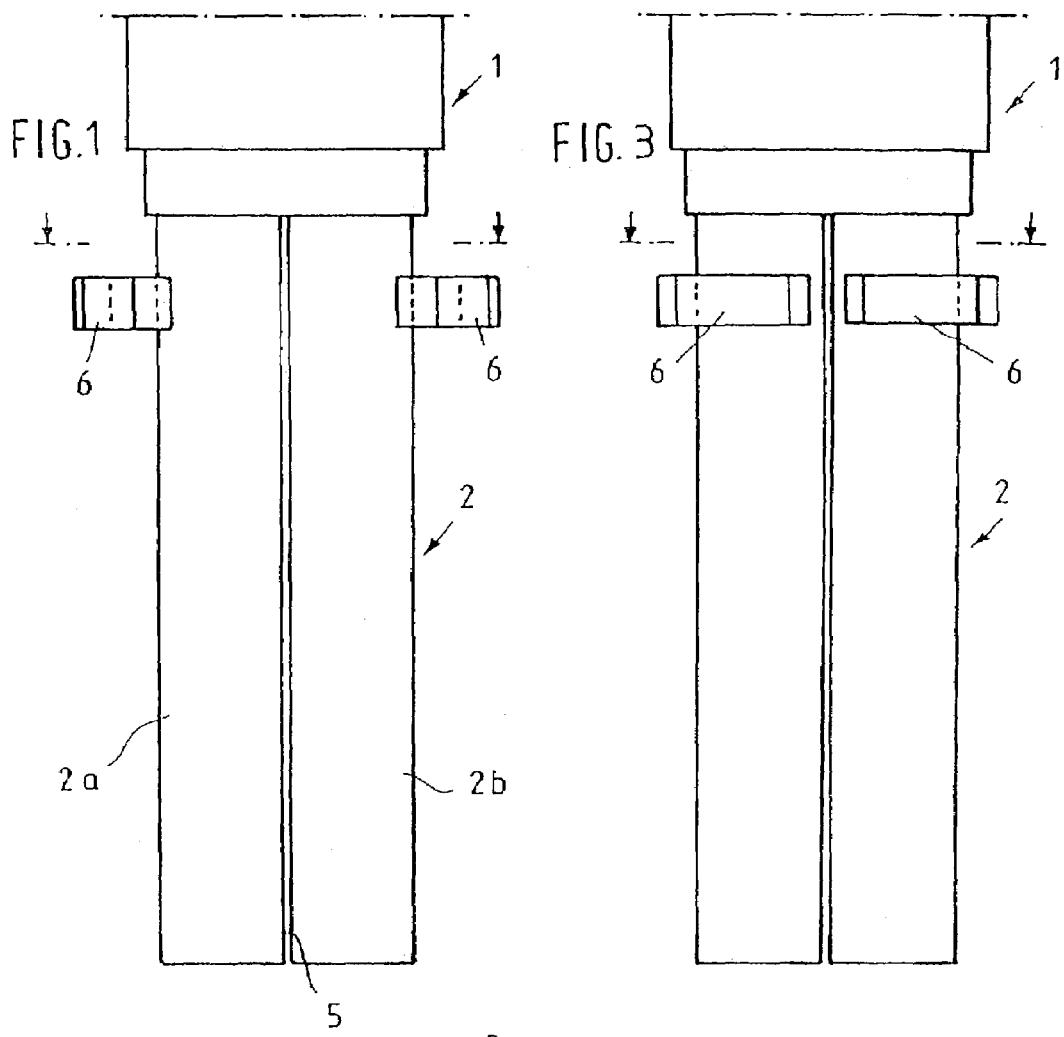
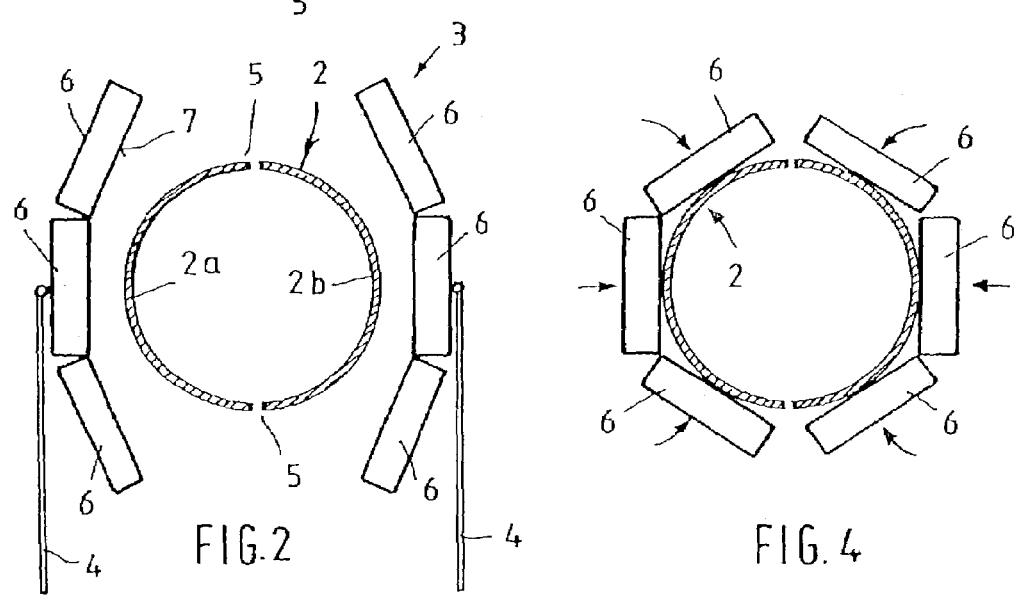

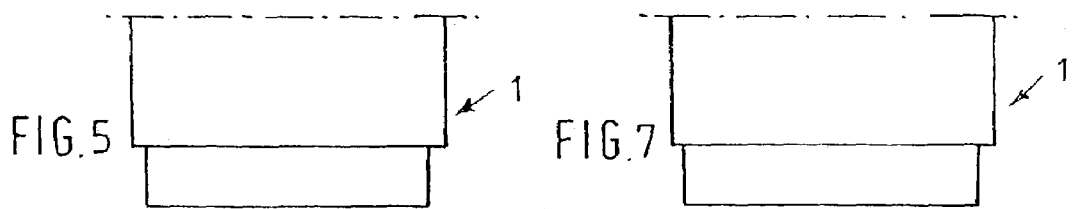
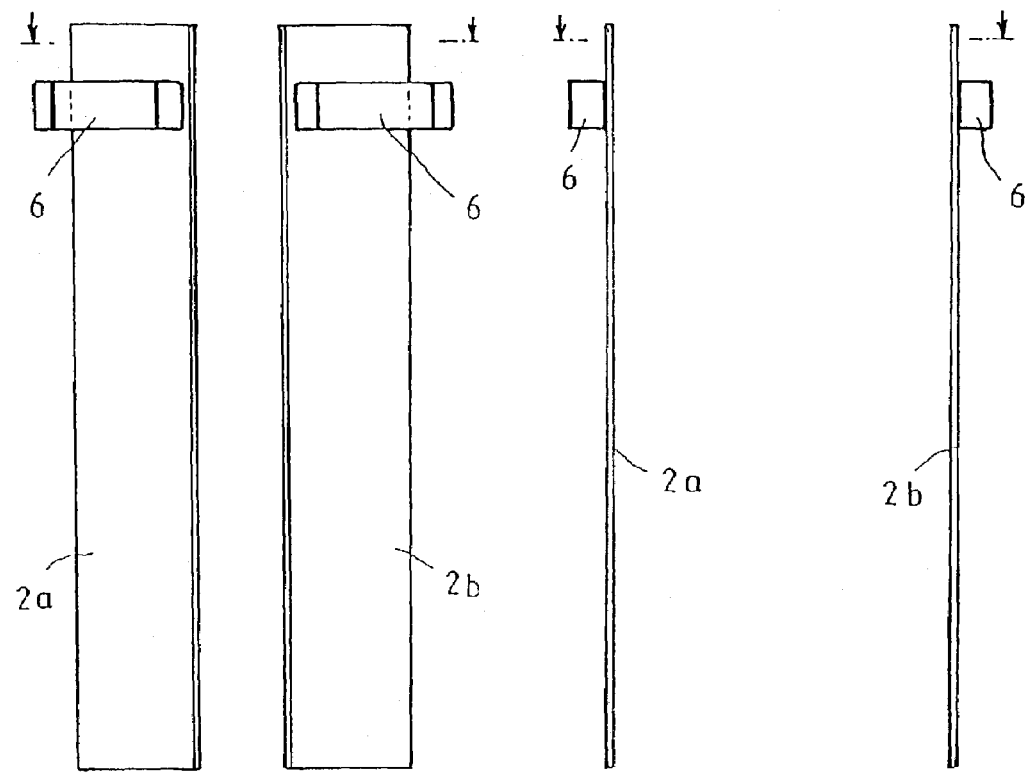
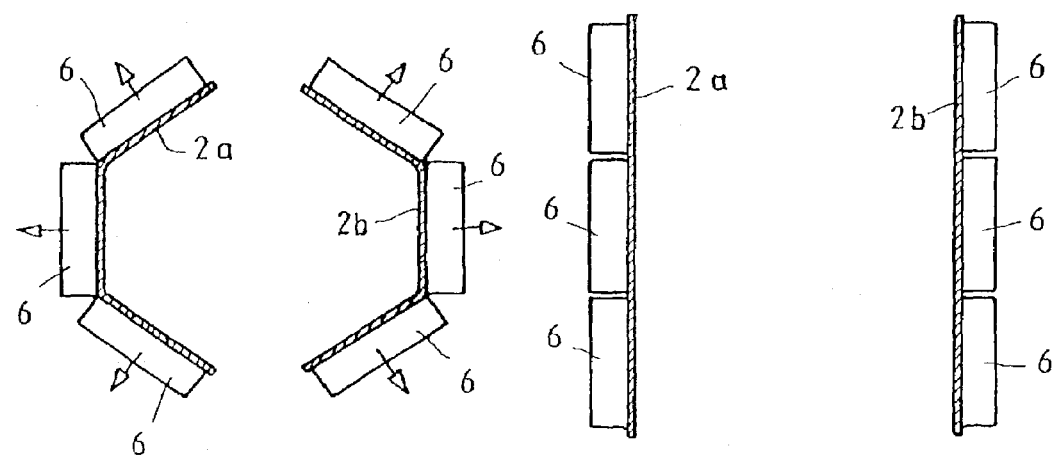

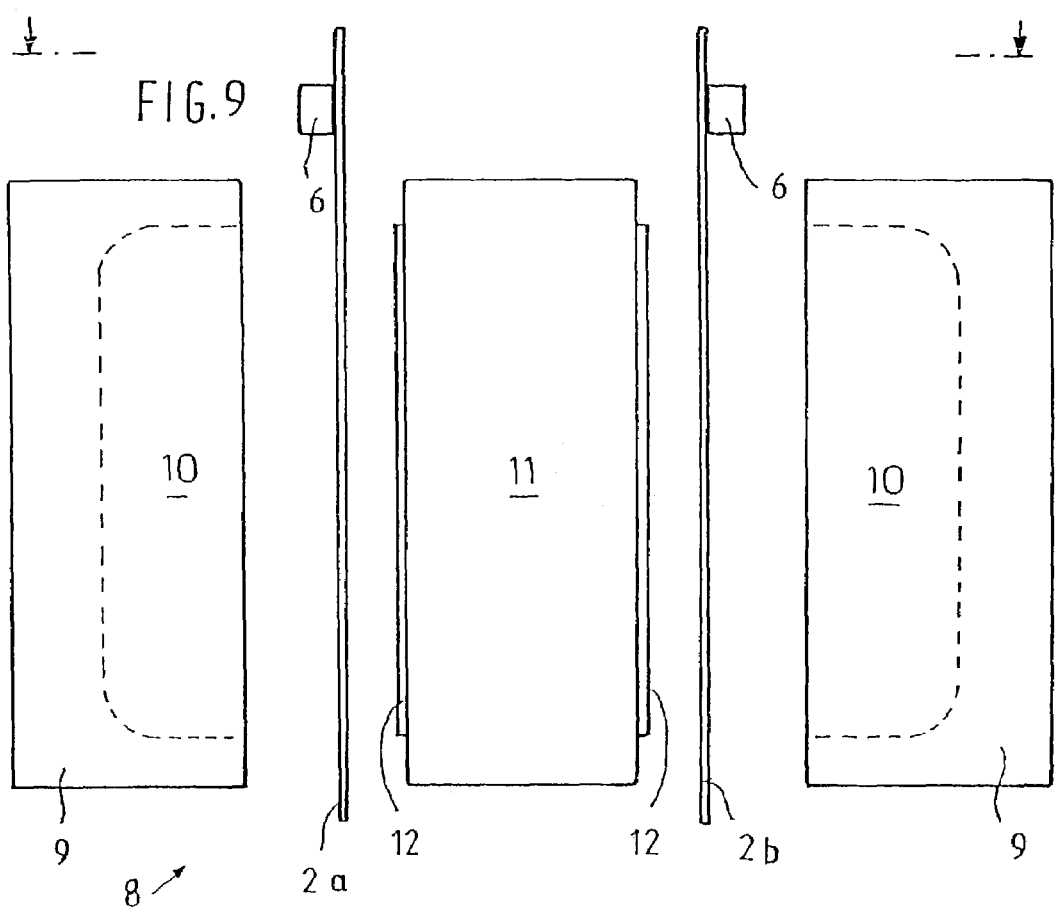
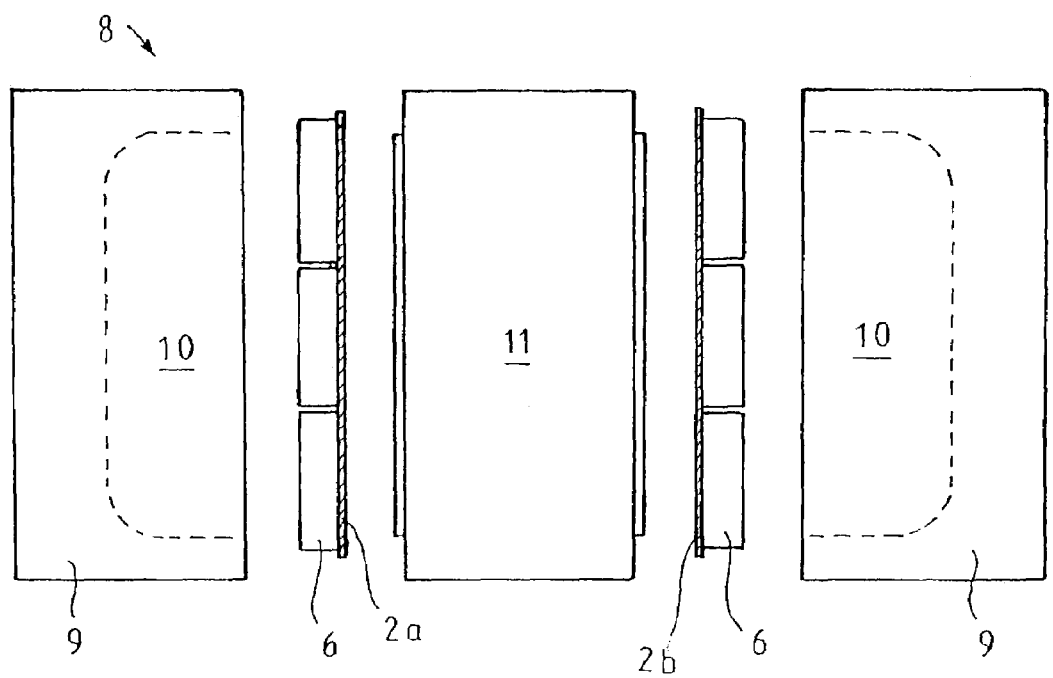

PROCESS FOR PRODUCING DISH-SHAPED MOLDINGS OF THERMOPLASTIC MATERIAL

FIELD OF THE INVENTION

The invention concerns a process for producing dish-shaped moldings of plastic material.

In this specification the term dish-shaped molding embraces a molding in the general shape of a dish or bowl and a hollow body of a corresponding configuration.

BACKGROUND OF THE INVENTION

One form of process for producing dish-shaped moldings or hollow bodies of thermoplastic material involves producing a preform which is at least approximately of a tubular configuration by the extrusion of thermoplastic material to a given length, and then axially dividing the preform to constitute at least one single-layer web of material. The web of material then has its final shape imparted thereto in a molding tool, in a procedure involving the first heat, namely the heat which the web still has from the extrusion procedure.

There are various endeavours aimed at producing dish-shaped moldings which are then possibly welded together to form hollow bodies, from flat pre-fabricated articles. Processes which are widely used for that purpose are the process known as the thermoforming process or the deep-drawing process. Those processes are comparatively expensive in terms of energy as they operate in the procedure referred to as using the second heat, thus involving a heating step for re-heating the article when it has already cooled down. A process of the above-indicated kind in which the preform is put into its final shape in a molding tool can be found for example in EP 1 110 697 A2. A process of the same general kind is also to be found in WO 01/60592 A1.

Above-mentioned EP 1 110 697 A2 describes a process for producing a fuel tank which is shaped by extrusion blow molding, in which a tubular preform is firstly extruded. On issuing from the extrusion head, the preform is cut up along its length by means of severing tools and divided into two curtain-like single-layer webs of material. For that purpose disposed beneath the extrusion head is a device for guiding and spreading the halves of the tubular preform when it has been cut open lengthwise. That guide device which is arranged substantially in a saddle roof configuration is provided with respective guide rollers over which the webs of plastic material, while still in a plastic condition, slide down. Arranged beneath the extrusion head is the molding tool comprising two mold halves each provided with a mold cavity portion. In that process dividing the tubular preform along its length is used to make it possible to arrange internal fitments to be mounted in the fuel tank between the webs of material in such a way that the fitments do not touch the preform prior to the beginning of the blow molding procedure. After those fitments have been suitably placed the mold halves of the molding tool close, in which case the webs of material forming the preform are welded together at the edges of the mold and squeezed off. The preform is then expanded within the mold cavity by blowing air being introduced thereinto.

WO 01/60592 A1 also describes a process for producing a fuel tank consisting of half-casing portions which are welded together. The half-casing portions are produced by extrusion of a tubular preform which, after extrusion, is spread out to form a flat, single-layer web of material which is in turn transformed into the finishedx half-casing portion in a mold comprising a cavity and a ram member.

Both in the case of the process disclosed in EP 1 110 697 A2 and also in the case of the process of WO 01/60592 A1 it is comparatively complicated and expensive for the tubular preform when it has been cut open to be opened out to form a flat preform which is as planar as possible. In both cases suitable guide elements, rollers and transportation means are required for that purpose. After the preform has been spread out it has to be accommodated by the molding tool and separated by the molding tool or optionally by separately provided tools from the subsequent extrusion portion which follows it as it is extruded from the extrusion head. Suitable operating means are also required for that purpose.

The device for guiding and spreading out the preform is found to be an impediment in particular when the extrusion apparatus is brought into operation or started up. For that purpose it may firstly be necessary to free the guides of the hardened material. The extrusion head and the guide devices are generally arranged at a height of about 5 meters above the ground so that preparatory procedures for bringing the apparatus into operation, which generally have to be carried out by hand, are usually difficult to implement.

SUMMARY OF THE INVENTION

An object of the present invention is to provide a process for producing dish-shaped moldings or hollow bodies of thermoplastic material, which is improved in terms of handleability and spreading of an extruded preform from which such a molding is made.

Another object of the present invention is to provide a process for producing dish-shaped moldings or hollow bodies of thermoplastic material from an at least approximately tubular preform, which can be carried into effect without requiring guide devices and rollers for spreading and fixing the preform and which consequently does not necessitate manipulation procedures beneath the extrusion head when starting up an extrusion process.

Still another object of the present invention is to provide a process for producing dish-shaped moldings of thermoplastic material which entails a simplified operating procedure.

In accordance with the principles of the present invention the foregoing and other objects are attained by a process for producing dish-shaped moldings or hollow bodies of thermoplastic material, comprising the production of an at least approximately tubular preform by extrusion of thermoplastic material to a defined length, and axially dividing the preform to form at least one single-layer web of material. The web of material is engaged by means of a manipulator and thereby removed from the extrusion head, the web of material being transversely spread out and/or stretched out by means of the manipulator transversely with respect to the direction of extrusion of the preform. The web of material is delivered to a molding tool by the manipulator so the web of material attains its final form in the molding tool in the first heat.

It will be noted at this point that the term single-layer web of material as used in the present specification does not exclude an extrudate which is made up of a plurality of layer portions constituting the single layer and which was produced for example by co-extrusion.

The invention is to be interpreted in such a fashion that it also embraces the extrusion of a preform which is approximately tubular or which may also be of a substantially U-shaped configuration, in which respect the invention capitalises on the use of an extrusion head with an annular gap nozzle for the extrusion procedure. Such an extrusion head makes it possible to produce extrudates of varying wall thickness in relation both to the length of the extrudate and also the periphery thereof. Furthermore the use of an extrusion head with an annular gap nozzle has the advantage that it is possible to have recourse to a wide range of different commercially available extrusion heads.

In a preferred feature of the process of the invention the preform is extruded in a hanging condition in the form of a tubular preform.

Depending on the properties of the respective extruded material various possible ways of cutting the preform to length can be appropriately considered. For example the preform can be cut off with a severing device provided for that purpose, beneath the extrusion head, for example by means of blades, shears, a hot wire or other suitable device for producing a cutting action in that respect.

A preferred feature of the invention provides that desired tear lines can be produced over the periphery of the preform at predetermined spacings by using wall thickness control in extrusion of the preform. In that manner the preform which is extruded to a predetermined length can be removed by the manipulator and, with the application of moderate forces to the preform, can be removed by tearing from the line of extruded material continuously issuing from the extrusion head.

In another preferred feature of the invention the preform can be axially divided at at least one location on its periphery by means of at least one severing or cutting tool arranged beneath the extrusion head. The operation of spreading the preform to form a single-layer web of material can be effected along only a single separating line so that the preform is developed or spread out over a periphery of 360° into one plane. It is equally possible to axially divide the preform symmetrically or asymmetrically by means of two or more than two separating or severing lines. According to the number of webs of material produced, the manipulator will have to be provided with a corresponding number of gripping devices or gripping arms for engaging the preform.

As an alternative to dividing up the preform in the lengthwise direction thereof beneath the extrusion head by means of a severing tool, it is possible to divide the preform within the extrusion head, by suitably dividing the flow of material therein.

For that purpose it may be desirable to provide between the flows of material which are divided within the extrusion head, a thin separating strip of a separating agent which is not joined to the rest of the extrudate, that is to say which cannot be fused or welded thereto or which does not adhere thereto. It is possible in that way to extrude a preform which is axially divided one or more times, in which case the extruded preform can be spread open without the use of additional tools beneath the extrusion head.

In still another preferred feature of the invention the preform production step involves the co-extrusion of a preform consisting of a plurality of layer portions, that is to say a laminate preform.

Independently of whether the extruded preform comprises a single layer portion or a plurality of layer portions, the preform can be extruded with a varying wall thickness over its length and/or its periphery. It is in that way ultimately possible to produce webs or runs of material which involve comparatively complicated wall thickness distribution.

Further objects, features and advantages of the invention will be apparent from the description hereinafter of a preferred embodiment.

BRIEF DESCRIPTION OF THE DRAWING

FIGS. 1 through 4 diagrammatically show an extrusion operation and the application of a manipulator to a tubular preform, FIGS. 5 through 8 show the procedure for removal of the webs of material from an extrusion head and the spreading thereof by means of the manipulator, and FIGS. 9 and 10 show transfer of the webs of material to the molding tools by means of the manipulator.

DESCRIPTION OF THE PREFERRED EMBODIMENT

Referring to FIG. 1, diagrammatically shown therein is an extrusion head which is generally identified by reference numeral 1 and at which a substantially tubular preform 2 is extruded hanging downwardly, in the direction of the force of gravity. The preform 2 is provided at each of two oppositely disposed locations and extending in the longitudinal direction thereof with an axial separating line 5 or cut which can be produced by means of severing tools (not shown) beneath the extrusion head. Hereinafter the process in accordance with the invention is described with reference to a preform 2 which has been axially divided in its lengthwise direction at first and second diametrally opposite locations, as indicated above. As noted at an earlier stage in this specification however it can also be provided that the preform 2 has only one separating line or cut 5, and the preform is then spread out or stretched by spreading the preform at that cut.

Alternatively it can be provided, as described hereinbefore, that axial severing of the preform 2 is effected within the actual extrusion head 1. For that purpose, the flow of material forming the fusible extrudate is divided in respect of its periphery within the extrusion head 1. So that the material does not re-combine on issuing from the extrusion head 1 it is desirable to extrude one or more thin strips of a separating agent between the divided flows of material. The separating agent involved is for example a thermoplastic material which cannot join for example by fusing, welding or adhesion to the material of which the preform 2 predominantly consists.

The sectional view in FIG. 2, taken along line II—II in FIG. 1, shows first and second gripping arms 4 of a manipulator generally indicated at 3. The gripping arms 4 are each operable to embrace a respective one of the material webs 2a, 2b produced from the preform 2 by virtue of the severing cuts 5. It will be appreciated that the manipulator 3 is shown here in a very greatly simplified form. In the described examples it comprises first and second gripping arms 4 which each have segments which are pivotable relative to each other.

As indicated by way of example in FIG. 2 three segments 6 can be provided on each gripping arm 4. The respective central segment 6 is mounted to the respective gripping arm 4. The segments 6 respectively arranged on each side of the central segment 6 are hingedly pivotable with respect to the central segment on each gripping arm 4.

The segments 6 form contact surfaces 7 which each face towards the preform, the contact surfaces 7 being provided with vacuum openings (not shown) communicating with passages for applying vacuum thereto. Although the drawing only shows three segments 6 for each gripping arm 4, it will be readily appreciated that the manipulator with its gripping arms 4 may have any number of segments 6 according to the requirements involved.

Looking now at FIGS. 3 and 4 the segments 6 of the gripping arms 4 of the manipulator 3 respectively embrace the preform 2 in such a way that it can be firmly fixed to the contact surfaces 7 by way of the action of the vacuum through the vacuum holes in the contact surfaces 7. The configuration of the segments 6 of the gripping arms 4 in FIG. 4 substantially approximates to the contour, in the form of a circular ring, of the at least substantially tubular preform 2. It will be apparent that the degree of approximation to the contour of the preform 2 increases, the greater the number of segments 6 on each gripping arm 4. The contact surfaces 7 of the segments 6 do not have to be of a flat nature but rather they can be of a concave configuration corresponding to the external contour of the preform 2.

Reference will now be made to FIGS. 5 through 8 showing that the segments 6 can be displaced from a receiving position as shown in FIG. 4 in which the segments 6 pick up the webs of the tubular preform, into a transfer position as shown in FIG. 8. In that way, the material webs 2a, 2b which are held in a condition of clinging to the segments 6 are spread out into a substantially straight position while in a still plastic condition. As shown in FIGS. 7 and 8 the webs 2a, 2b which are held and spread out by the segments 6 of the manipulator 3 are then fed by the manipulator 3 to the molding tools 8 shown in FIGS. 9 and 10.

Looking therefore now at FIGS. 9 and 10 the molding tools 8 comprise first and second cavity mold portions 9 each having a respective cavity 10 and a centrally arranged cover mold portion 11 which is provided on each of its sides towards the cavities 10 with a contour configuration 12 corresponding to the cavity 10. For the purposes of molding the webs 2a, 2b of material the two cavity mold portions 9 close against the cover mold portion 11, in which case a respective part of the webs 2a, 2b of material is pressed into the cavity 10 by the contour configuration 12 of the cover mold portion 11. The cavity 10 is completely filled by means of the plastic material while still in an elastic plastic condition either by evacuation of the cavities 10 or by way of compressed air which is supplied through the cover mold portion 11. After the cavity mold portions 9 are closed the manipulator 3 can release the webs 2a, 2b.

The operating procedure involved in the process according to the invention is as follows:

Firstly, as shown in FIGS. 1 and 3, the tubular preform 2 is ejected in a hanging condition from the extrusion head 1 to a length which is predetermined by the tooling involved. In that situation the preform 2 can be provided with one or two severing cuts 5 immediately beneath the extrusion head 1. As noted above the severing cuts 5 can already be produced within the extrusion head 1 or they can be made by means of a cutting tool arranged beneath the extrusion head 1. After the preform 2 has reached its predetermined length the two gripping arms 4 of the manipulator 3 embrace it, and the contact surfaces 7 of the segments 6, which are provided with the vacuum openings, are caused to bear against the surface of the preform 2, this being the condition shown in FIG. 4. The vacuum is operative in that respect to cause the webs 2a, 2b of material of the preform 2 to cling to the contact surfaces 7.

By virtue of control of the wall thickness of the extrudate within the extrusion head 1 the preform 2 can be provided with a peripherally extending thin location at which therefore the wall thickness of the extrudate is reduced to constitute a desired-tear line.

In a next step in the procedure the gripping arms 4 of the manipulator 3 implement a lowering or downward movement which is in the same direction as the direction of extrusion of the preform 2 from the extrusion head 1 but which is implemented more rapidly than the extrusion speed. As a result the preform 2 or the webs 2a, 2b thereof are torn away from the material being extruded from the extrusion head 1, at the previously produced desired-tear line formed by the above-mentioned reduced-thickness location. Simultaneously with the downward movement or only slightly thereafter the webs 2a, 2b can each be spread or stretched approximately into one plane. For that purpose the segments 6 are moved into a position of being straightened relative to each other, that is to say they are in a position of being substantially aligned with each other. If the operation of cutting the webs 2a, 2b to length by severing them from the continuously extruded portion of material as it is extruded from the extrusion head 1 is initiated by the downward movement of the gripping arms 4, the operation of spreading out the webs 2a, 2b, simultaneously with initiation of the downward movement or in only slightly time-displaced relationship, can assist with the operation of cutting the webs 2a, 2b to length or tearing them away from the extrudate issuing from the extrusion head.

It is not necessarily required for the webs of material 2a, 2b to be spread out into one plane by means of the manipulator 3. It is alternatively possible, depending on the respective situation of use involved, for the segments arranged on the gripping arms 4 to be movable from a substantially concave receiving position into a convex transfer position in which the respective webs 2a, 2b in question are transferred to the molding tool.

After the material webs 2a, 2b have been engaged by the manipulator 3 and spread into the straight position shown in FIGS. 9 and 10, they are suitably positioned between the molding tools 8. The gripping arms 4 can be for example parts of a robot which is rotatable and/or pivotable in a plurality of axes, preferably six axes. The webs of material 2a, 2b can be moved for example to molding tools 8 which are arranged spatially separately from the extrusion head 1.

After the cavity mold portions 9 and the cover mold portion 11 have been closed the webs of material 2a, 2b can be released from the manipulator by switching off the effect of the vacuum holding the webs in place, and the cavity mold portions 9 and the cover mold portion 11 are then available to take over further webs of material.

According to the invention, it can also be provided that the webs of material 2a, 2b are laid out horizontally by means of the manipulator 3 and spread out on a deep-drawing mold which is open at its top side and into which the material can then be drawn by vacuum in the appropriate fashion.

It will be seen from the foregoing description that the procedure of the process according to the invention combines various advantages. For example expensive and complicated guides and rollers or the like for spreading and fixing the web of material are no longer required so that consequently any manipulation operations beneath the extrusion head when bringing the extrusion apparatus into operation can be eliminated. In addition it is no longer necessary for the material web to be cut to length or severed from the continuously extruded portion of material by virtue of a movement of the molding tool, possibly with the assistance of per se known cutting devices. Instead it is provided in accordance with the invention that the preform is removed from the extrusion head by means of the manipulator.

With such a procedure, it is no longer necessarily required for the molding tools to be arranged beneath the extrusion head. The preform which has been removed by the manipulator from the extrusion apparatus and spread out to form a web of material can be transported by means of the manipulator so that it is possible for the molding tools to be stationarily arranged at a distance from the extrusion head.

It will be appreciated that the above-described embodiment of the process of the invention has been set forth solely by way of example and illustration of the principles thereof and that various modifications and alterations may be made therein without thereby departing from the spirit and scope of the invention.

What is claimed is:

1. A process for producing dish-shaped moldings of thermoplastic material, including the steps of:
    forming a substantially tubular preform, having a wall thickness and an outer periphery, to a given length by extrusion of thermoplastic material from an extrusion head;
    axially dividing said preform to form at least one web of said material;
    providing a manipulator having gripping arms, each arm provided with a plurality of segments;
    placing said segments in engagement with said outer periphery of said web of material, whereby said plurality of segments embrace said outer periphery of said web of material;
    removing said web of material from said extrusion head;
    spreading said web of material from a substantially tubular preform into a substantially straight condition by use of the gripping arms;
    providing a molding tool;
    transferring said web of material to said molding tool; and
    forming said web of material into a dish-shaped molding in said tool.

2. A process as set forth in claim 1 wherein the preform is extruded hanging downwardly in the form of a substantially tubular preform.

3. A process as set forth in claim 1 wherein the web of material is torn away from the extrusion head by means of the manipulator.

4. A process as set forth in claim 1 wherein said given length is defined by thinned wall locations around the periphery of the preform formed by control of the wall thickness of the preform upon extrusion thereof at predetermined spacings along the length of said preform.

5. A process as set forth in claim 1 wherein the step of axially dividing the preform is carried out at at least one location on the periphery of said preform by means of at least one severing tool arranged beneath the extrusion head.

6. A process as set forth in claim 1 wherein the step of axially dividing the preform is carried out within the extrusion head to form a separation gap at at least one location on the periphery of said preform.

7. A process as set forth in claim 6 wherein a separating agent is extruded with the preform in the region of the separation gap produced within the extrusion head.

8. A process as set forth in claim 7 wherein the separating agent comprises a thermoplastic material which cannot be fused, welded or adhered to the thermoplastic material which comprises the preform.

9. A process as set forth in claim 1 wherein said substantially tubular preform is formed by the coextrusion of a plurality of layer portions.

10. A process as set forth in claim 1 wherein the wall thickness of the preform is varied over the length thereof.

11. A process as set forth in claim 1 wherein the wall thickness of the preform is varied around the periphery thereof.

* * * * *